United States Patent
Monk

(10) Patent No.: US 11,333,261 B2
(45) Date of Patent: *May 17, 2022

(54) LEAK DETECTION AND PREVENTION DEVICE

(71) Applicant: Monk Intellectual Properties, LLC, Tequesta, FL (US)

(72) Inventor: David T. Monk, Tequesta, FL (US)

(73) Assignee: Monk Intellectual Properties, LLC, Tequesta, FL (US)

(*) Notice: Subject to any disclaimer, the term of this patent is extended or adjusted under 35 U.S.C. 154(b) by 2 days.

This patent is subject to a terminal disclaimer.

(21) Appl. No.: 17/101,596

(22) Filed: Nov. 23, 2020

(65) Prior Publication Data

US 2021/0071773 A1 Mar. 11, 2021

Related U.S. Application Data

(63) Continuation of application No. 16/694,700, filed on Nov. 25, 2019, now Pat. No. 10,876,646, which is a continuation-in-part of application No. 15/340,390, filed on Nov. 1, 2016, now Pat. No. 10,487,480.

(60) Provisional application No. 62/249,969, filed on Nov. 3, 2015.

(51) Int. Cl.
| | |
|---|---|
| *F16K 17/36* | (2006.01) |
| *G01M 3/04* | (2006.01) |
| *E03B 7/07* | (2006.01) |
| *D06F 39/08* | (2006.01) |

(52) U.S. Cl.
CPC ............. *F16K 17/366* (2013.01); *G01M 3/04* (2013.01); *D06F 39/081* (2013.01); *E03B 7/071* (2013.01); *G01M 3/042* (2013.01); *Y10T 137/0452* (2015.04); *Y10T 137/1842* (2015.04); *Y10T 137/7727* (2015.04); *Y10T 137/7793* (2015.04)

(58) Field of Classification Search
CPC ....... F16K 17/396; G01M 3/04; G01M 3/042; E03B 7/071; Y10T 137/7793; Y10T 137/0452; Y10T 137/1842; Y10T 137/7727; D06F 39/081
See application file for complete search history.

(56) References Cited

U.S. PATENT DOCUMENTS

| | | |
|---|---|---|
| 187,373 A | 2/1877 | Goodwin et al. |
| 203,590 A | 5/1878 | Colborne |
| 749,810 A | 1/1904 | Truman |
| 1,518,461 A | 12/1924 | Smith |
| 2,475,585 A | 7/1949 | Baird |
| 2,576,168 A | 11/1951 | Allen |
| 2,724,401 A | 11/1955 | Page |
| 2,798,503 A | 7/1957 | Carver et al. |
| 3,472,253 A | 10/1969 | Herscher et al. |
| 3,874,403 A | 4/1975 | Fischer |
| 3,920,031 A | 11/1975 | Maxfield |
| 4,294,276 A | 10/1981 | Harrison |
| 4,374,379 A | 2/1983 | Dennison, Jr. |
| 4,513,776 A | 4/1985 | Chen |

(Continued)

*Primary Examiner* — Michael R Reid
*Assistant Examiner* — Frederick D Soski
(74) *Attorney, Agent, or Firm* — McHale & Slavin, P.A.

(57) ABSTRACT

A liquid leak detection and prevention device comprised of a leak detection apparatus positioned near a water-dependent appliance to monitor for moisture due to a leak, and a leak prevention system connected to the leak detection apparatus in fluid communication with a water pipe attached to the water-dependent appliance and positioned in-line with the water pipe is disclosed.

20 Claims, 7 Drawing Sheets

(56) References Cited

U.S. PATENT DOCUMENTS

| | | |
|---|---|---|
| 4,570,311 A | 2/1986 | Kawamura et al. |
| 4,670,939 A | 6/1987 | Fisher |
| 4,843,305 A | 6/1989 | Akiba |
| 4,909,274 A | 3/1990 | Rodriguez |
| 5,188,143 A | 2/1993 | Krebs |
| 5,240,022 A | 8/1993 | Franklin |
| 5,586,589 A | 12/1996 | Voelker |
| 5,601,111 A | 2/1997 | Sodergard |
| 5,632,302 A | 5/1997 | Lenoir, Jr. |
| 6,024,116 A | 2/2000 | Almberg et al. |
| 6,131,877 A | 10/2000 | Kerger et al. |
| 6,253,785 B1 | 7/2001 | Shumake, Jr. et al. |
| 6,526,807 B1 | 3/2003 | Doumit et al. |
| 6,543,471 B1 | 4/2003 | Carroll |
| 6,792,967 B1 | 9/2004 | Franklin |
| 6,895,990 B1 | 5/2005 | Carroll |
| 6,899,122 B1 | 5/2005 | Mele |
| 7,218,237 B2 | 5/2007 | Kates |
| 7,424,896 B1 | 9/2008 | Martin et al. |
| 7,562,673 B1 | 7/2009 | Martin et al. |
| 7,665,482 B2 | 2/2010 | McLean |
| 7,703,476 B1 | 4/2010 | Carroll |
| 7,866,336 B1 | 1/2011 | Gutierrez |
| 8,006,714 B1 | 8/2011 | Martin et al. |
| 8,061,380 B1 | 11/2011 | Martin et al. |
| 8,443,823 B1 | 5/2013 | Prager |
| 8,776,824 B2 | 7/2014 | Yao |
| 2014/0026987 A1 | 1/2014 | Ayers et al. |
| 2014/0116540 A1 | 5/2014 | Waldor |
| 2016/0244616 A1 | 8/2016 | Paolilli |
| 2020/0124195 A1 | 4/2020 | Monk |

LEAK DETECTION AND PREVENTION DEVICE

PRIORITY

In accordance with 37 C.F.R. 1.76, a claim of priority is included in an Application Data Sheet filed concurrently herewith. Accordingly, the present invention claims priority as a continuation of U.S. patent application Ser. No. 16/694,700, entitled, "LEAK DETECTION AND PREVENTION DEVICE", filed Nov. 25, 2019, which was a continuation-in-part of U.S. patent application Ser. No. 15/340,390, entitled, "A WATER LEAK DETECTION AND PREVENTION DEVICE", filed Nov. 1, 2016, which claims priority to U.S. Provisional Patent Application No. 62/249,969, entitled "WATER LEAK DETECTION AND PREVENTION DEVICE", filed Nov. 3, 2015. The contents of the above referenced applications are incorporated herein by reference in their entirety.

FIELD OF THE INVENTION

The present invention relates to a water and moisture detection device; and more particularly, to a sensor detection and prevention system that, following the detection of water leaks from a water-dependent plumbing line in a commercial or residential setting, obstructs the incoming water flow.

BACKGROUND OF THE INVENTION

Water leaks are a common problem associated with air conditioners, hot water heaters, washing machines, and various other water-dependent appliances used in buildings such as homes, townhouses, apartments, mobile homes, and offices. Unfortunately, water leaks are typically detected only after a substantial leak or a substantial accumulation of water has developed. Thus, it would be advantageous to have the benefit of an early-warning and prevention system for detecting these common water leaks before costly repairs become necessary to correct resulting damages and protect further damage therefrom.

Maintaining and protecting a commercial or residential setting can be difficult and costly. Conditions such as fires, gas leaks, etc. are a danger to the occupants and the structure. Other malfunctions, such as water leaks in plumbing, are not necessarily dangerous for the occupants, but can nevertheless cause considerable damage. In many cases, an adverse condition created by water leakage is not detected in its early stages when the damage and/or danger are relatively small. Water leaks are always inconvenient and may cause incidental damage to furniture, electrical equipment, and other property. Furthermore, this problem is compounded by the prevalence of aging appliances, aging water pipes, and deteriorated joints therein.

There have been many developments in the art seeking to detect water leaks occurring in water-related appliances and the like. A water detector may be an electronic device designed to detect the presence of water and provide an alert in time to limit or allow prevention of water damage. Prior art designs are generally comprised of a small cable or device that lies flat on a floor and relies on the electrical conductivity of water to decrease the resistance across two contacts. When sufficient water is present to bridge the contacts, the device sounds an audible alarm together with signaling. Such devices are useful in a normally occupied area with an infrastructure that has the potential to leak water, such as an HVAC, water pipes, drain pipes, vending machines, dehumidifiers, or water tanks. For instance, U.S. Pat. No. 5,188,143 discloses a water leakage detector sensitive to the presence of moisture and adapted for installation around a water vessel. The detector has an elongated, flexible sensing strip comprised of a pair of conductors separated by insulation. Each conductor includes an electrode coupled with a wire lead extending via a cable to an electrical plug. A circuit housing having an audible alarm operably connected to an electrical socket adapted to detachably connect with the plug is provided.

Although prior art water detectors utilize warning sounds to notify of a water leak and are equipped with a certain detection function in the event that the user is away from the home or commercial establishment, they are unable to immediately notify the user about the water leakage. Thus, by the time the user is aware of the water leakage, the water may have accumulated to a level to cause significant damage to the floor, carpet, interior decoration or furniture, resulting in expensive remodeling or handy work for the owner. In other words, such a conventional water leakage detection system with warning sounds is not of practical use if the user is not always present. Furthermore, the reliability of these water leak detection devices can be questionable because they rely on electronic means for sensing the presence of moisture or fluid. These devices are susceptible to not being triggered by a water leak because of a reliance on electronic or conductive means for sensing the presence of moisture or fluid. For example, U.S. Pat. No. 4,843,305 discloses an apparatus for sensing leaks in water pipes based upon the conductivity of spaced-apart pairs of insulated conductors which are wrapped around the pipe. Unfortunately, leaking water may not always establish contact with all exposed areas of the insulated conductors, or the leaking water may not adhere to the conductors, thereby failing to signal a leak. Additionally, corrosion or the loss of electricity or power from batteries provides another failure point. Similarly, U.S. Pat. No. 4,374,379 teaches a moisture sensing apparatus for pipes that also uses a pair of spaced-apart electrical conductors partially positioned in an elongated flexible insulator which is circumferentially affixed to such pipe. The partially exposed electrical connectors are oppositely disposed relative to the pipe. An alarm actuating circuit is interconnected with the conductors and configured to initiate the alarm when water bridges the spaced apart conductors. However, this apparatus is insensitive to small leaks where water droplets are unable to bridge the sensing electrode gap disposed on the opposite sides of the sensor assembly.

Furthermore, there exists leak detection devices that have electronic sensor elements, such as described above, that measure the conductivity of the water and use such a detection means to energize a solenoid or other such device to turn off an associated water valve. Unfortunately, the electronic circuitry adds cost and reduces reliability, as discussed above. It also requires the presence of electrical power to function. Thus, if a water leak were to occur coincidentally with an electrical power outage, such as may occur with a large storm, the valve will fail to accomplish its purpose unless auxiliary power is available.

There are several prior art devices that provide water shutoff protection utilizing a water sensor that changes physical properties when placed in contact with water, resulting in activation of a valve shutoff device. For instance, U.S. Pat. No. 2,798,503 utilizes a water softenable link that dissolves when coming into contact with water leaking from a water heater into an associated drip pan. As described, the cable attaching the water softenable link to the shutoff valve must be positioned directly beneath the shutoff valve so that the softenable link can be anchored in the drip pan. While appropriate for this installation, it would not provide the flexibility to be applicable on other applications. U.S. Pat. No. 3,920,031 describes a water shutoff device associated with a water heater application. The water detection means involves the use of a water-soluble material held in compression by a spring. The water detection means is placed in a drip pan that surrounds the base of the water heater such that, as water leaks from the faulty water heater, it will reach a level to dissolve the detection means, which in turn releases a spring driven valve that is plumbed into the water supply line of the water heater. U.S. Pat. No. 6,024,116 provides a water softenable latch that, when exposed to water, will release a valve mechanism from its open to closed state, thus turning off the water and gas supply in a water heater. Unfortunately, the installation of such shutoff devices described above requires intensive plumbing skills or would involve hiring a licensed plumber to comply with local building codes.

Thus, what is lacking in the art is a water leak detection and prevention device whereby the leak detector utilizes a water soluble sensor coupled with a water shut-off device to provide obstruction of incoming water through a water pipe using a spring-loaded plunger for use with clothes washing machines, dishwashing machines, toilets, sinks, refrigerators, or the like, that is easily installed and does not require electrical or battery power for operation.

SUMMARY OF THE INVENTION

A water leak detection and prevention device having a leak detection mechanism positioned near a water-dependent appliance to monitor for moisture due to a leak and a leak prevention system connected to the leak detection apparatus. The leak prevention system is in fluid communication with a water pipe attached to the water-dependent appliance, and positioned in-line with the water pipe. The leak prevention system is comprised of a water-line coupling having a water detection mechanism for releasing an obstructive object to block the flow of water when triggered by the presence of water by the leak detection apparatus. The obstructive object, e.g. ball, is positioned above the piping and released into the flow of water, whereby gravity and water pressure from incoming water flow in the water pipe holds the ball firmly against a seal or seat within the water-line coupling and prevents further water leakage by blocking the flow of water therethrough.

Accordingly, it is an objective of the instant invention to provide a water leak detection and prevention device with a mechanism for obstructing water flow through a water pipe in the event of the detection of water or moisture.

It is another objective of the present invention to provide a water leak detection and prevention device that can be installed by the average homeowner.

Still another objective of the present invention is to provide a water leak detection and prevention device that provides a central bore through the water-line coupling that allows water to flow unobstructed therethrough in normal operation, but is closed when a leak is detected.

Another objective of the present invention is to provide a water leak detection and prevention device that provides a compact, simple water obstruction in the event of a water leak.

It is still another objective of the present invention to provide a water leak detection and prevention device which utilizes a water-soluble substance in compression or tension mode in the leak detection apparatus to detect the presence of moisture or a water leak.

Yet another objective of the present invention is to provide a water leak detection and prevention device which maintains normal operating condition of the water pipe when the water soluble leak detection apparatus is not activated.

Still yet another objective of the present invention is to provide a water leak detection and prevention device which is able to completely enclose the leakage of water in a water pipe such that the water does not flow or leak out, in order to keep the floor dry and clean without causing wetness to the interior décor of the home or establishment and its furnishings.

Yet a further objective of the present invention is to provide a water leak detection and prevention device for detecting water leaks without a requirement for batteries or any other type of electrical power which may cause safety hazards if faults occur.

Still yet a further objective of the present invention is to provide a water leak detection and prevention device that utilizes gravity to place an obstruction in the water line in response to a detected leak.

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
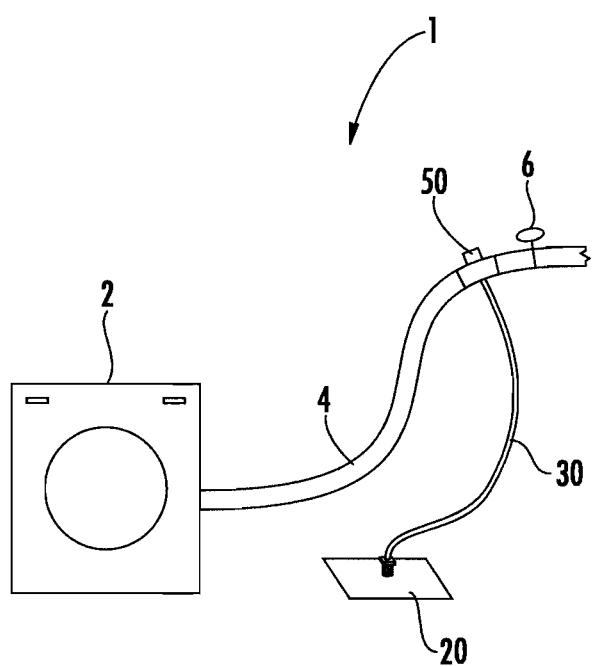
FIG. 1 is a pictorial representation of the present invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

As shown in FIG. 1, a water leak detection and prevention device 1 is comprised of a leak detection apparatus 20 positioned near a water-dependent appliance 2 to monitor for moisture due to a leak and a leak prevention system 50 connected to the leak detection apparatus 20 and in fluid communication with a water pipe 4 attached to the water-dependent appliance 2. It is contemplated that the leak prevention system 50 is situated nearest the water supply valve 6 so that, upon the presence of a leak, water is immediately obstructed from flowing through the water pipe 4.

Figure 2:
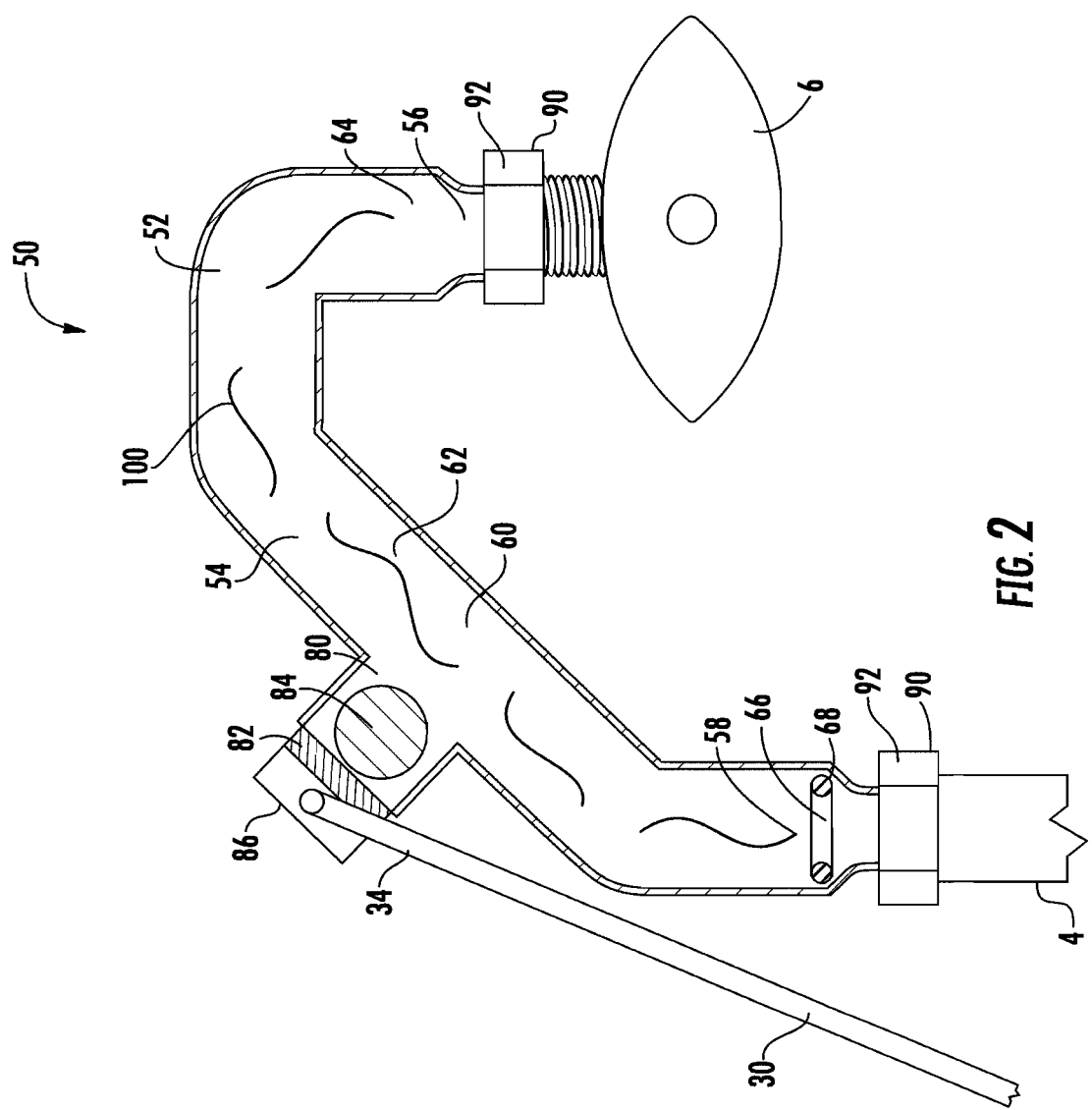
FIG. 2 is a pictorial representation of the leak prevention system of the present invention when not activated.
Figure 3:
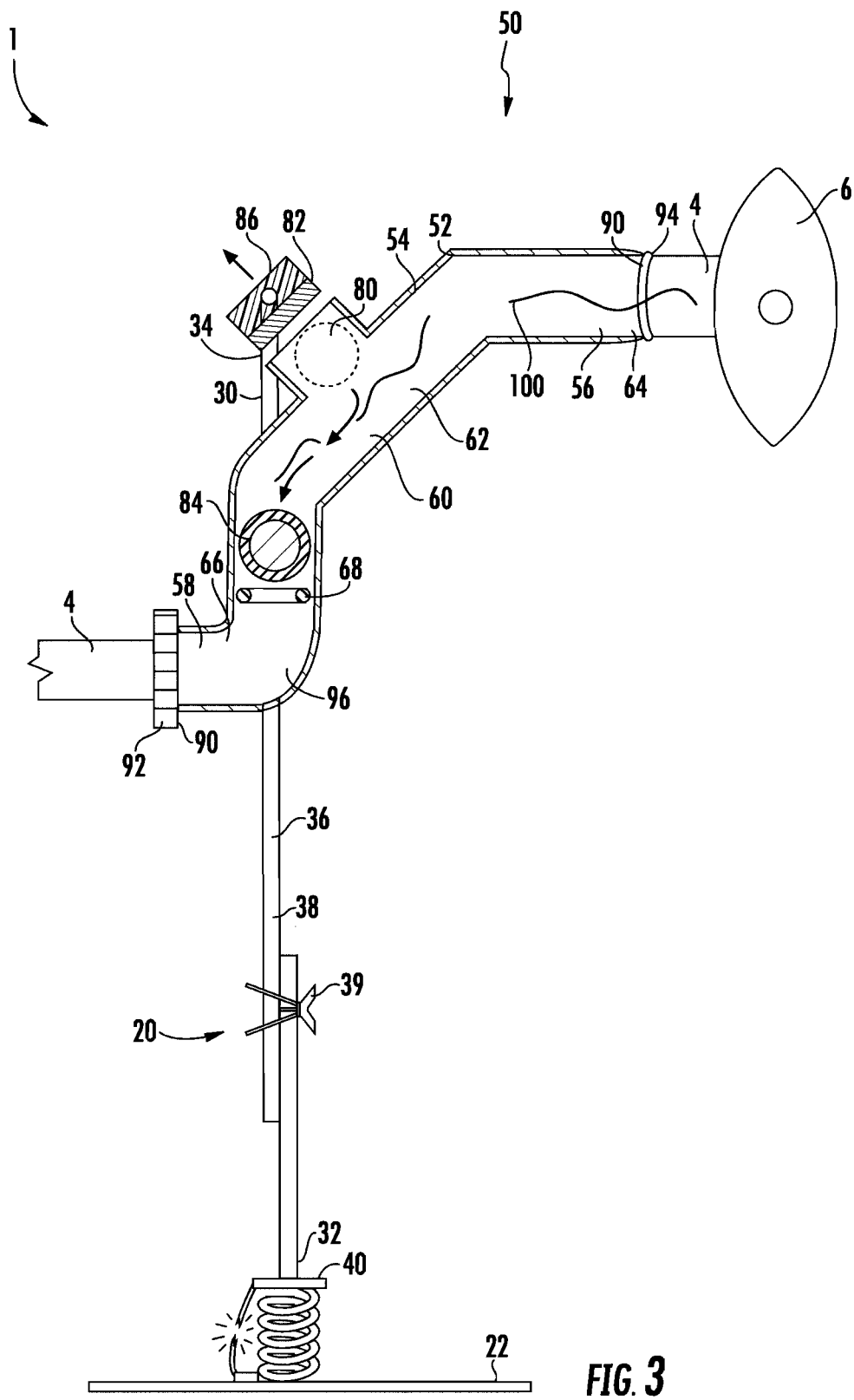
FIG. 3 is a pictorial representation of the leak prevention system of the present invention when activated.

As shown in FIGS. 2 and 3, the leak prevention system 50 is comprised of a water-line coupling 52 positioned in-line with a water pipe 4. One non-limiting embodiment of the water-line coupling 52 includes a T-shaped valve 54 having an inlet opening 56, outlet opening 58, a center bore 60, and a port 80 therebetween the inlet and outlet openings, 56 and 58. The water-line coupling 52 is positioned such that the flow of water 100 within a water pipe 4 flows from the inlet opening 56 to the outlet opening 58 uninterrupted. The water-line coupling 52 is positioned so that the port 80 sits above the flow of water 100 within the pipe, placing the port 80 in a relatively vertical position. This construction allows gravity to place an obstruction object, such as a ball 84, within the flowing water when needed to block the water flow. Additionally, the water-line coupling 52 is contemplated as being installed nearest the water supply valve 6. The inlet and outlet opening, 56 and 58, may include a hose coupling 90, such as but not limited to cam and groove, quick connect, expansion ring, air king, garden hose thread, ground joint, hose clamp, soldering, glue joint or the like. By way of example, a compression fitting 92 is used in FIG. 2 as the hose coupling 90. Also by way of example, a combination solder joint 94 on the inlet opening 56 and a compression fitting 92 on the outlet opening 58, as illustrated in FIG. 3, is used in situations where the water pipe 4 is made of copper at the water supply valve 6, which is common. A hose coupling 90 is a connector on the end of the inlet or outlet openings, 56 and 58, to connect (or couple) it with the water pipe 4.

The port 80 is located between the inlet and outlet openings, 56 and 58. The port 80 includes a carrier 82 that, when triggered by the presence of moisture or water by the leak detection apparatus 20, releases a ball 84 or other obstructive object. The ball 84 is positioned below the carrier 82, and held in place by the carrier 82 until it is released into the center bore 60, whereby water pressure from incoming water flow 100 in the water pipe 4 holds the ball 84 firmly within the water-line coupling 52 at the outlet opening 58 and prevents further water leakage by blocking the entry of water therethrough. Gravity forces the ball 84 to fall within the center bore 60 and obstructs the flow of water at the tapered end of the center bore 60, discussed further below. The port 80 has a water-tight seal 86. The ball 84 is sized to obstruct water when released by the carrier 82 into the center bore 60. It is contemplated that the carrier 82 is comprised of a magnet that magnetically holds a metal or otherwise magnetic ball 84 in place; whereby release of the ball allows gravity to pull the ball into the flow of water passing through the pipe and valve. The ball 84 would be corrosion resistant and may be coated with plastic or rubber, yet still have the magnetic properties to remain held in place by the carrier 82.

The center bore 60 is comprised of a central portion 62 and opposite tapered ends 64 and 66. The first tapered end 64 begins at the inlet opening 56 and the second tapered end 66 begins at the outlet opening 58. The second tapered end 66 includes an O-ring 68 about the periphery thereof, and is sized to be smaller than the diameter of the ball 84. An alternative embodiment of the instant invention includes an elbow joint 96 at the outlet opening 58, whereby it provides a secondary means of obstructing the flow of water 100 in the water pipe 4, as the ball 84 would not be able to pass through the elbow joint 96, shown in FIG. 3. It should also be noted that in place of the O-ring 68, tapers or seats that may include molded in place rubber, Teflon plastic, copper or the like may be utilized without departing from the scope of the invention.

When the water-line coupling 52 is attached to the water pipe 4, it is water-tight. The magnetic carrier 82 is set in place with the ball 84 attached thereto, as shown in FIG. 2. Upon the presence of moisture or water, detected by the leak detection apparatus 20, the carrier 82 releases the ball 84, as shown in FIG. 3. A connector 30, which is attached to the magnetic carrier 82 on one end 34 and the leak detection apparatus 20 on the other end 32, allows the magnetic carrier 82 to release the ball 84. Upon release, gravity forces the ball 84 to fall out of the port 80 and into the center bore 60. The flow of water 100 will then push the ball 84 against the tapered end 66 of the center bore 60 at the outlet opening 58 and provide an obstructed passage for the flow of water 100. The force of the flow of water 100 will continue to push the ball 84 against the tapered end 66 and O-ring 68, which only creates more sealing force between the ball 84 and O-ring 68, thereby creating a tighter seal. This seal obstructs the flow of water 100 from being introduced into the rest of the water pipe 4 where the leak is taking place.

Figure 4:
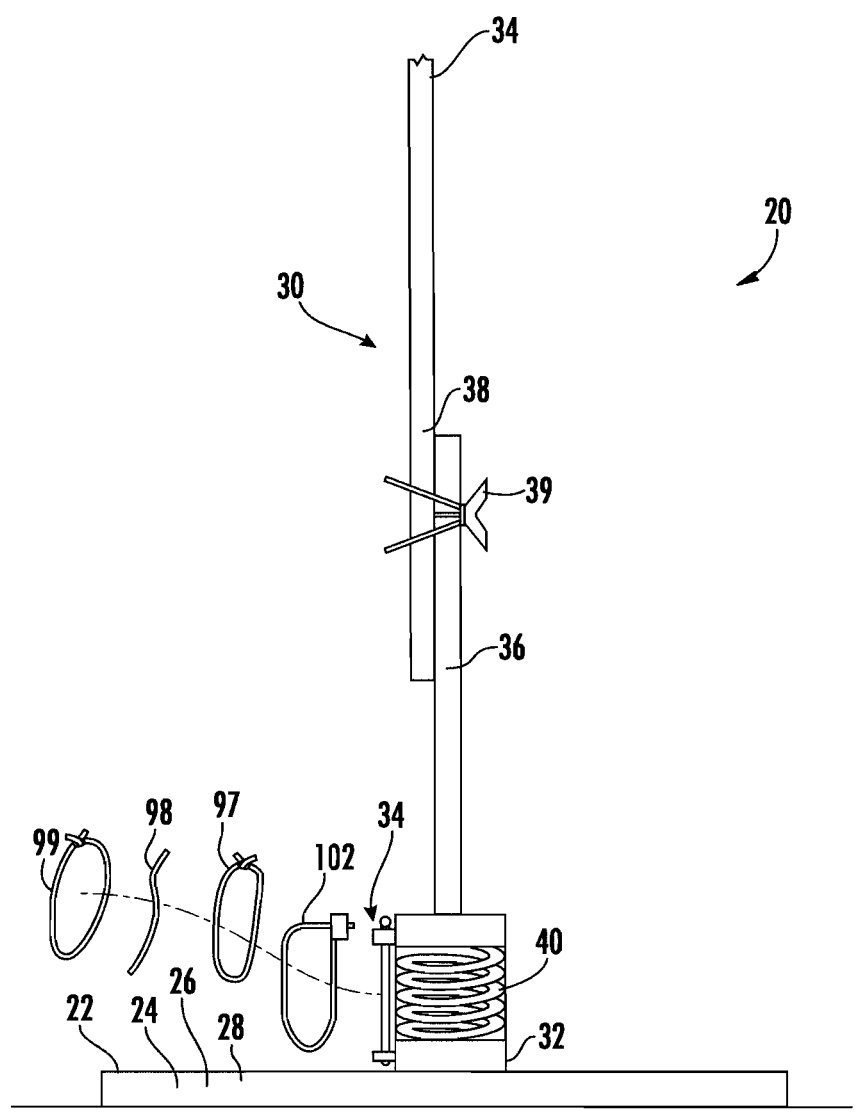
FIG. 4 is a side view of the leak detection apparatus of the present invention.

As shown in FIGS. 1 and 4, the leak detection apparatus 20 is comprised of a sheet 22 and connector 30. The sheet 22 is positioned near a water-dependent appliance 2 to monitor for moisture due to a leak, and the connector 30 is attached on one end 32 to the sheet 22 and on the opposite end 34 to the magnetic carrier 82. The sheet 22 is contemplated as being constructed of an absorbent or water soluble material. In one embodiment, the sheet 22 is constructed of a water-soluble fabric 24 or threads which are composed of webs of hot water soluble polyvinyl alcohol fibers 26 and a water-soluble resin 28 fixably adhered to the fibers 26 of which the fabric 24 is composed.

The connector 30 is comprised of an adjustable length push rod assembly 36 and a spring-loaded trigger mechanism 40. The spring-loaded trigger mechanism 40 is placed atop the sheet 22 and held in compression by a water-soluble retention component 42. The water-soluble retention component 42 is constructed, similarly to the sheet 22, of a water-soluble fabric which is composed of webs of hot water soluble polyvinyl alcohol fibers 26 and a water-soluble resin 28 fixably adhered to the fibers of which the fabric is composed. Upon the presence of water or moisture, the water-soluble retention component 42 releases the compression on the spring-loaded trigger mechanism 40, which can thereby move and exact a force on the connector 30, which in turn causes the magnetic carrier 82 to move away from the ball and thereby release the ball 84 from the magnetic carrier 82 on the opposite end 34 of the connector 30. The water-soluble retention component 42 is in fluid communication with the sheet 22 so that any water or moisture on the sheet 22 or water-soluble retention component 42 causes a release of compression on the spring-loaded trigger mechanism 40. The push rod assembly 36 includes an adjustable arm 38 and a screw wing nut 39 to allow flexibility in height discrepancies in water pipes 4 in any home or business. The water-soluble retention component 42 can be formed into a string, a cord, a thread, a zip tie, or any other attachment component which can hold the spring-loaded trigger mechanism 40 under tension, and allow it to be released upon the presence of water or moisture.

Figure 5:
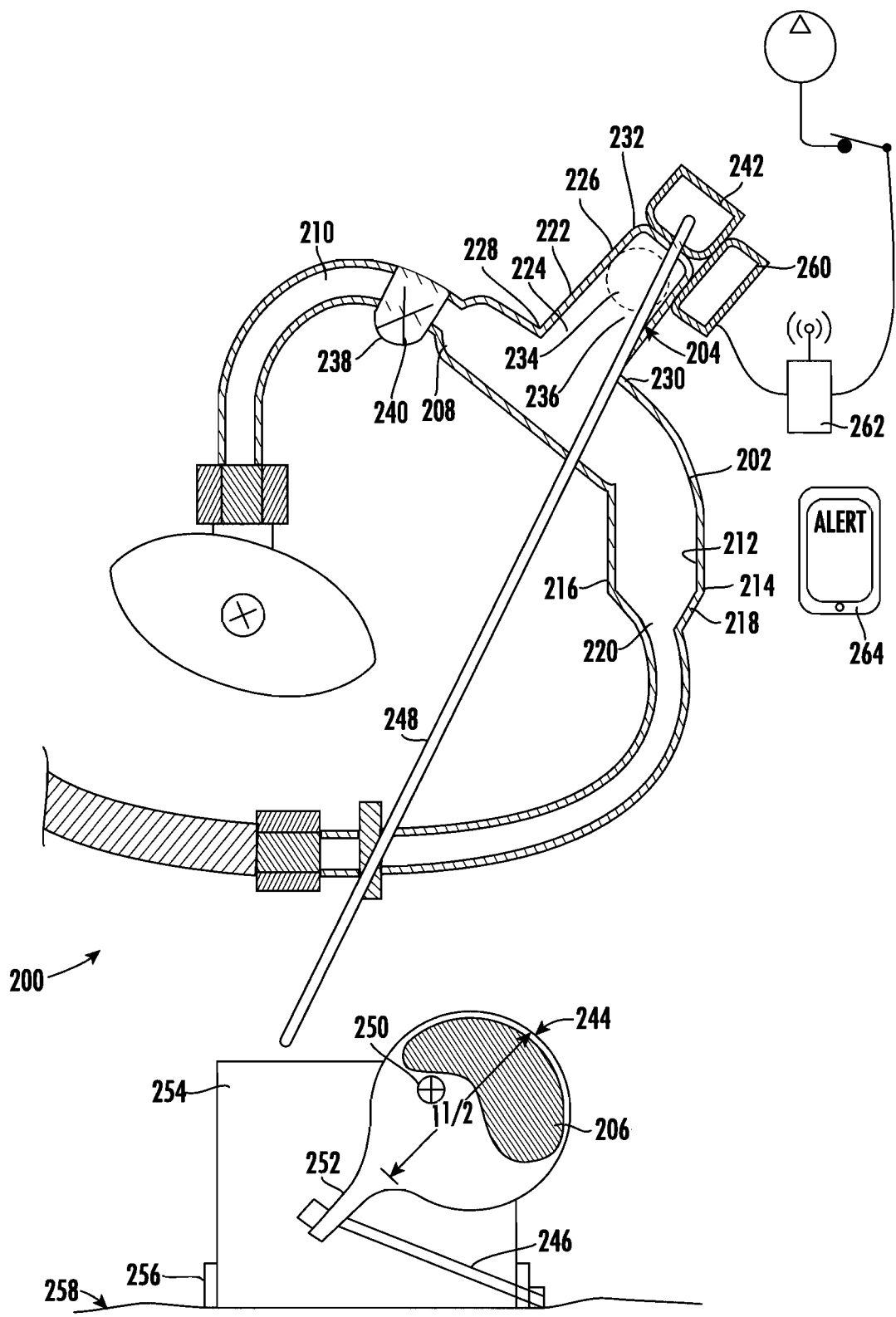
FIG. 5 is a pictorial representation of an alternative embodiment of the present system.
Figure 6:
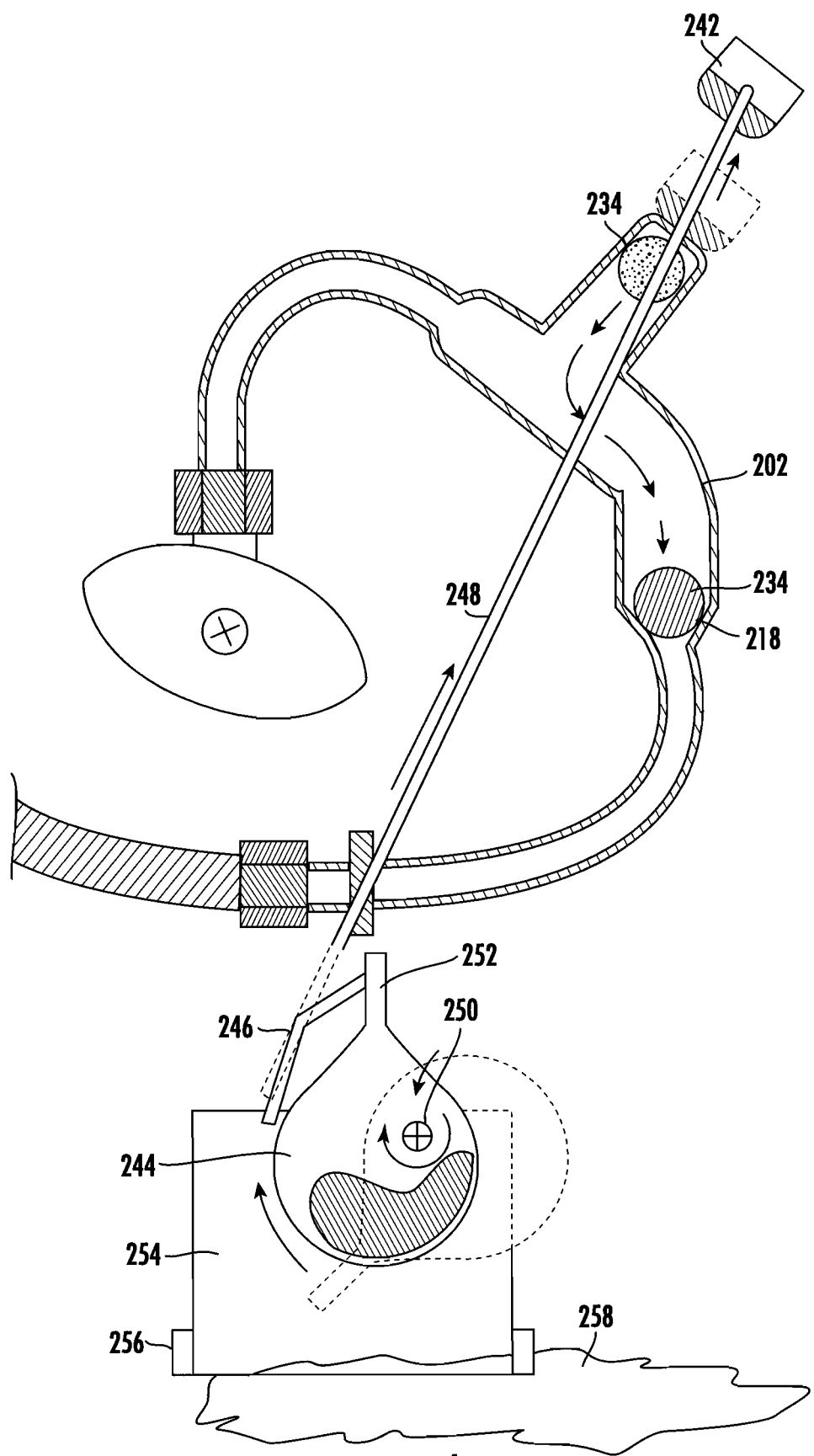
FIG. 6 is a pictorial representation of one embodiment of the embodiment illustrated in FIG. 5, illustrating the system in an operation position shutting off the flow of water.
Figure 7:
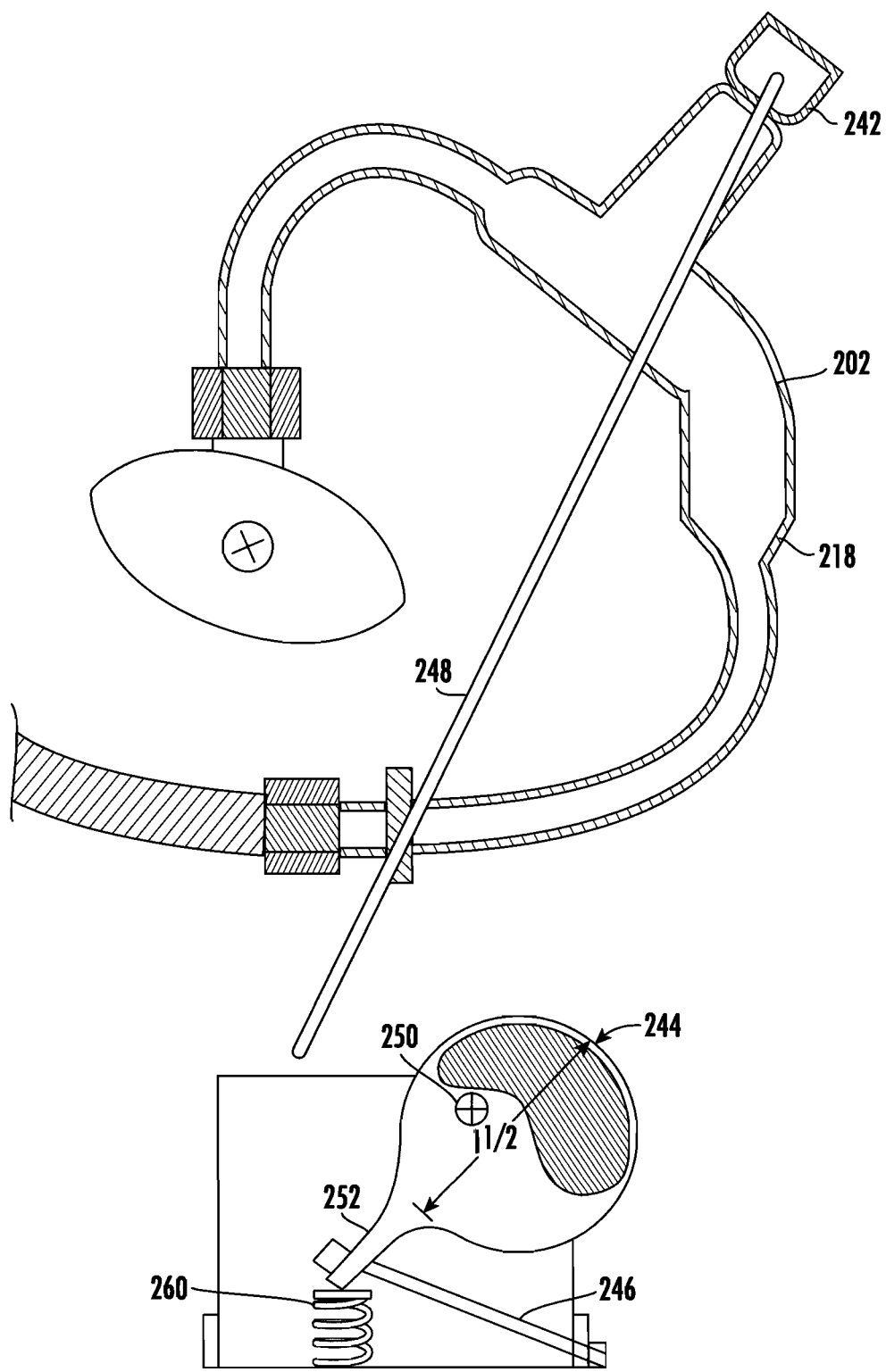
FIG. 7 is a pictorial representation of another alternative embodiment of the present system.

Referring to FIGS. 5-7, an alternative embodiment of the leak prevention system 200 is illustrated. The leak prevention system 200 includes a flow pipe member 202, a flow stopping apparatus 204, and a leak detecting apparatus 206. The flow pipe member 202 has a first end 208 connected to a source of fluid 210; the fluid having a pressure higher than ambient air pressure around the flow pipe member. The fluid of the preferred embodiment is water; however, it should be noted that the present system can be utilized with almost any fluid, including liquids and gasses to prevent unwanted or uncontrolled flow. The system is particularly useful to prevent spills in the event of a catastrophic failure of a pipe or the like. The flow pipe 202 is tubular in construction, having an inner bore 212 and an outer diameter 214 when viewed from an end, to allow the flow pipe member 202 to direct the pressurized fluid from the source of pressurized fluid 210 to a second end 216 of the flow pipe member 202. The second end 216 of the flow pipe member 202 includes a tapered shape 218 having a smaller exit aperture 220 than the inner bore 212. The flow stopping apparatus 204 is constructed and arranged for stopping the flow of the pressurized fluid through the fluid pipe member 202. To accomplish the stoppage of pressurized fluid, the fluid pipe member 202 is provided with an outrigger pipe 222; the outrigger pipe 222 being tubular and having an internal bore 224 and an outside diameter 226. A first end 228 of the outrigger pipe 222 is connected to a sidewall 230 of the flow pipe member 202 so that the inner bore 212 of the flow pipe member 202 and the inner bore 224 of the outrigger pipe 222 are in fluid communication with each other and the connection between the two pipes is watertight. The second end 232 of the outrigger pipe 222 is closed to prevent fluid flow therethrough. A ball member 234 is positioned within the inner bore 224 of the outrigger pipe 222; the ball member 234 being sized to pass within the inner bores 212, 224 and including a sufficient amount of iron to be attracted to magnetic forces. The ball member 234 having a first position at the second end 232 of the outrigger pipe 222 for allowing the pressurized fluid to pass through the flow pipe member 202 unimpeded. The ball member 234 is held in the second end 232 of the outrigger pipe 222 by a magnetic member 242 positioned outside the second end 232 of the outrigger pipe 222. The ball member having a second position, whereby an outer surface 236 of the ball member 234 is positioned adjacent the tapered portion of the flow pipe member 202 for stopping the flow of the pressurized fluid through the flow pipe member 202. The ball member 234 is held in position adjacent the tapered portion 218 of the flow pipe member 202 by the pressurized fluid, seating the outer surface of the ball against the inner surface of the tapered portion 218. In this manner, the ball member 234 is held in its first position by magnetic forces until a leak or irregular flow condition is detected. When the leak or irregular flow is detected, the magnetic forces are removed, allowing the ball member 234 to drop into the flow of the pressurized fluid 210, causing the ball to seat into the tapered portion 218 of the flow pipe member 202 to stop the flow of pressurized fluid 210. It should be noted that while the second end of the flow pipe member 202 is described as tapered, other shapes such as frustoconical and the like, may be utilized without departing from the scope of the invention. Resetting the device requires the pressure on the fluid to be removed so that a magnetic member can be used to guide the ball back to the first position where the magnetic member 242 can be utilized to hold the ball member 234 in place. It should also be noted that while the ball member 234 is described as including iron and the magnetic forces are applied from outside the flow pipe member 202, the ball member 234 could contain a magnet, and a piece containing iron could be placed outside the pipe without departing from the scope of the invention. A flow detecting apparatus 238 may be utilized for detecting flow through the flow pipe member. The flow detecting apparatus 238 may be electronic, or it may be mechanical, such as a flow meter 240. The flow detecting apparatus 238 may be electrically connected with suitable electronics, such as solenoids or the like, to move the magnetic member 242 away from the end of the outrigger pipe 222 to release the ball member 234 into the pressurized fluid flowing through the flow pipe member 202. The fluid flow detecting apparatus 238 may be constructed and arranged to detect flows beyond a predetermined threshold, whereby said ball member 234 is released into said flow pipe member 202 when said predetermined threshold is exceeded. In an alternative embodiment, the fluid flow detecting apparatus 238 may be a pressure monitor for monitoring the pressure of the pressurized fluid within the flow pipe member 202, whereby pressures above and/or below a predetermined threshold are detected. In yet another alternative embodiment, the flow detecting apparatus 238 may be a leak detector for monitoring for the pressurized fluid on a surface. In one embodiment, the leak detector includes a water soluble member 246. In this embodiment, an unbalanced mass 244 is secured in a loaded position with the water soluble member 246 so that the unbalanced mass 244 moves to an unloaded position (FIG. 6) when the water soluble member 246 is dissolved; the unbalanced mass 244 causing movement of a link member 248 traversing from said loaded to said unloaded positions. The link member 248 is connected to the magnet member 242 to cause movement thereof to release the ball member 234. In a preferred embodiment, the unbalanced mass 244 includes a pivot 250 about which the unbalanced mass 244 is free to rotate, an arm 252 extending outwardly from one side of the unbalanced mass 244 for cooperation with the link member 248 to cause movement thereof upon rotation of the unbalanced mass 244. The unbalanced mass 244 may be secured to a vertical plate member 254, said vertical plate member 254 being secured to a horizontal plate member 256, the horizontal plate member 256 being constructed and arranged to sit adjacent a surface 258 for which said pressurized fluid is to be detected on. In at least one embodiment, a spring member 260 may be provided to cooperate with the unbalanced mass 244 to move with more force than that provided by the unbalanced mass 244 when a leak is detected. In a most preferred embodiment, the water soluble member 246 is constructed from poly vinyl alcohol. However, it should be noted that other materials for detecting other fluids may be utilized without departing from the scope of the invention. It should also be noted that the ball member 234 may include a metallic inner portion and a cover surface. In some embodiments, the cover surface of the ball member 234 includes a polymer, the polymer being compliant to deform when in contact with the tapered surface 218 of the flow pipe member 202. In other embodiments, the tapered portion 218 of the flow pipe member 202 includes a polymer coated surface, the polymer being compliant to deform when in contact with the ball member 234. In either embodiment, the polymer may be rubber, VITON, TEFLON or any other number of polymers suitable for sealing surfaces. It should also be noted that in some embodiments, a sensor, such as a proximity sensor 260 may be utilized to monitor the position of the ball member 234 or the magnetic member 242 to determine if flow has been stopped in the flow pipe member 202. In these embodiments, the sensor 260 may be electrically connected to a monitoring system 262 which may have the ability to send an alarm to a cell phone 264 or land line as is known in the art.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A fluid flow prevention device comprising:
    a flow pipe member having a first end connected to a source of fluid having a pressure higher than ambient air pressure around said flow pipe member, said flow pipe member being tubular in construction, having an inner bore and an outer diameter when viewed from an end, said flow pipe member directing said pressurized fluid from said source of pressurized fluid to a second end of said flow pipe member, said second end of said flow pipe member having a tapered shape having a smaller exit aperture than said inner bore;
    a flow stopping apparatus, for stopping the flow of said pressurized fluid through said flow pipe member, said flow pipe member having an outrigger pipe, said outrigger pipe being tubular and having an internal bore and an outside diameter, a first end connected to a sidewall of said flow pipe member so that said inner bores of said flow pipe member and said inner bore of said outrigger pipe are in fluid communication with each other, a second end of said outrigger pipe being closed to prevent fluid flow therethrough, a ball member positioned within said outrigger pipe, said ball member including a sufficient amount of iron to be attracted to magnetic forces, said ball member having a first position at said second end of said outrigger pipe for allowing said pressurized fluid to pass through said flow pipe member, said ball member being positioned at said second end of said outrigger pipe by a permanent magnetic retention member positioned outside said second end of said outrigger pipe, said ball member having a second position whereby an outer surface of said ball member positioned adjacent said tapered portion of said flow pipe member for stopping the flow of said pressurized fluid through said flow pipe member, said ball member held in position adjacent said frustoconical portion of said flow pipe by said pressurized fluid;
    a flow detecting apparatus for detecting flow through said flow pipe member, said flow detecting apparatus including a link member constructed and arranged to move said magnetic member away from said second end of said outrigger pipe so that upon detection of a leaked fluid said ball member is released into said pressurized fluid flowing through said flow pipe member, the link member including at least two links coupled together to provide an adjustable length.

2. The fluid flow prevention device of claim 1 wherein said pressurized fluid is mechanically monitored.

3. The fluid flow prevention device of claim 2 wherein said mechanical monitoring includes a water soluble member.

4. The fluid flow prevention device of claim 3 including an unbalanced mass, said unbalanced mass secured in a loaded position with said water soluble member so that said unbalanced mass moves to an unloaded position when said water soluble member is dissolved, said unbalanced mass causing movement of the link member traversing from said loaded to said unloaded positions, said link member connected to said magnetic retention member to cause movement thereof to release said ball member.

5. The fluid flow prevention device of claim 4 including a spring member providing said unbalanced mass to move with more force than that provided by the unbalanced mass.

6. The fluid flow prevention device of claim 3 wherein said unbalanced mass includes a pivot about which said unbalanced mass is free to rotate, an arm extending outwardly from one side of said unbalanced mass for cooperation with said link member to cause movement thereof upon rotation of said unbalanced mass.

7. The fluid flow prevention device of claim 6 wherein said unbalanced mass is secured to a vertical plate member, said vertical plate member secured to a horizontal plate member, said horizontal plate member constructed and arranged to sit adjacent a surface for which said pressurized fluid is to be detected on.

8. The fluid flow prevention device of claim 3 wherein said water soluble member is constructed from poly vinyl alcohol.

9. The fluid flow prevention device of claim 3 wherein said tapered portion of said flow pipe member is frustoconical in shape.

10. The fluid flow prevention device of claim 1 wherein said fluid flow detecting apparatus is a flow meter.

11. The fluid flow prevention device of claim 10 wherein said fluid flow detecting apparatus detects flows beyond a predetermined threshold, whereby said ball member is released into said flow pipe member when said predetermined threshold is exceeded.

12. The fluid flow prevention device of claim 1 wherein said fluid flow detecting apparatus is a pressure monitor for monitoring the pressure of said pressurized fluid.

13. The fluid flow prevention device of claim 12 wherein said fluid flow detecting apparatus detects pressures below a predetermined threshold, wherein said ball member is released into said flow pipe member when said predetermined threshold is detected.

14. The fluid flow prevention device of claim 1, wherein said ball member includes a permanent magnetic inner portion and a cover surface.

15. The fluid flow prevention device of claim 14, wherein said cover surface of said ball member includes a polymer, said polymer being compliant to deform when in contact with said tapered surface of said flow pipe member.

16. The fluid flow prevention device of claim 14, wherein said cover surface of said ball member is rubber.

17. The fluid flow prevention device of claim 1 wherein said flow detecting apparatus is a leak detector, said leak detector monitoring for said pressurized fluid on a surface.

18. The fluid flow prevention device of claim 1 wherein said ball member is a permanent magnet and said magnetic member positioned outside said second end of said outrigger pipe includes iron.

19. The fluid flow prevention device of claim 1, wherein said tapered portion of said flow pipe member includes a polymer coated surface, said polymer being compliant to deform when in contact with said ball member.

20. The fluid flow prevention device of claim 1, wherein said ball member is a permanent magnet and said magnetic member positioned outside said second end of said outrigger pipe is a permanent magnet.

* * * * *